US008393063B2

(12) United States Patent
Hodges et al.

(10) Patent No.: US 8,393,063 B2

(45) Date of Patent: Mar. 12, 2013

(54) BRAKE PAD SPREADER TOOL FOR DISC BRAKE ASSEMBLIES

(75) Inventors: Matthew M. Hodges, Lincoln, NE (US); Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 188 days.

(21) Appl. No.: 13/091,861

(22) Filed: Apr. 21, 2011

(65) Prior Publication Data

US 2012/0266428 A1 Oct. 25, 2012

(51) Int. Cl.
*B23P 19/04* (2006.01)
*B25B 27/00* (2006.01)

(52) U.S. Cl. .................. 29/239; 81/487; 269/6; 269/96; 269/128; 29/268

(58) Field of Classification Search .................. 269/128, 269/160, 203, 205, 216, 254 CS, 3, 6, 96; 29/239, 244, 267, 268; 81/485, 487; *B25B 27/16*
See application file for complete search history.

(56) References Cited

U.S. PATENT DOCUMENTS

| | | | | | |
|---|---|---|---|---|---|
| 1,339,448 | A | * | 5/1920 | Forsman et al. | 269/3 |
| 2,160,652 | A | | 5/1939 | Feigh | |
| 2,249,651 | A | * | 7/1941 | Gilbert | 24/527 |
| 3,427,016 | A | * | 2/1969 | Harris | 269/214 |
| 3,492,854 | A | * | 2/1970 | Eppler | 72/412 |
| 3,705,581 | A | * | 12/1972 | Drake | 606/53 |
| 3,835,522 | A | * | 9/1974 | Ward | 29/239 |
| 4,220,322 | A | * | 9/1980 | Hobday | 269/6 |
| 4,253,648 | A | * | 3/1981 | Meeks | 269/4 |
| 4,893,801 | A | * | 1/1990 | Flinn | 269/6 |
| 4,926,722 | A | * | 5/1990 | Sorensen et al. | 81/487 |
| 5,170,682 | A | * | 12/1992 | Sorensen et al. | 81/487 |
| 5,709,372 | A | * | 1/1998 | Lii | 269/6 |
| 5,732,936 | A | | 3/1998 | Lii | |
| 6,523,238 | B1 | * | 2/2003 | Priddy | 29/239 |
| 6,574,846 | B1 | * | 6/2003 | Kang | 29/239 |
| 6,585,243 | B1 | | 7/2003 | Li | |
| 6,678,931 | B1 | * | 1/2004 | Tatasciore | 29/239 |
| 6,874,217 | B2 | * | 4/2005 | Ploeger et al. | 29/239 |
| 7,076,850 | B2 | * | 7/2006 | Ploeger et al. | 29/239 |
| 7,155,792 | B1 | | 1/2007 | Miller, Jr. | |
| 8,276,251 | B2 | | 10/2012 | Mitchell | |
| 2002/0070490 | A1 | * | 6/2002 | Klimach et al. | 269/6 |
| 2004/0123438 | A1 | * | 7/2004 | Kang | 29/239 |
| 2004/0255445 | A1 | | 12/2004 | Ploeger et al. | |
| 2005/0000073 | A1 | * | 1/2005 | Ploeger et al. | 29/239 |

(Continued)

FOREIGN PATENT DOCUMENTS

GB 2 194 989 A 3/2011

OTHER PUBLICATIONS

Lisle catalog, No. 24400 disc Brake Pad Spreader, p. 4.

(Continued)

*Primary Examiner* — Lee D Wilson
*Assistant Examiner* — Tyrone V Hall, Jr.
(74) *Attorney, Agent, or Firm* — Banner & Witcoff, Ltd

(57) ABSTRACT

A tool for spreading disc brake pads and compressing pistons of a disc brake caliper assembly includes a manually operated handle to drive a rod attached to a pusher plate. An arm assembly also connects the back end of the drive rod to the pusher plate. The plates thus extend in cantilever fashion from the drive rod and may be maintained in alignment by the arm assembly which also serves to reinforce the cantilever arrangement of the plates.

16 Claims, 5 Drawing Sheets

U.S. PATENT DOCUMENTS

2011/0010906 A1* 1/2011 Mitchell ........................ 29/239
2012/0204393 A1* 8/2012 Gentner et al. ................. 29/257

OTHER PUBLICATIONS

California Tool Co. catalog, K-D Disc Brake Pad Spreader, No. 2145, Section 63, p. 760.
California Tool Co. catalog, OTC Disc Brake Pad Spreader, No. 7034, Section 63, p. 760.
California tool Co. catalog, K-D Disc Brake Pad Spreader, No. 3376, Section 63, p. 760.
California Tool Co. catalog, ATD Tools, Disc Brake Pad Spreader, No. 5050, Section 63, p. 761.
California Tool Co. catalog, Cal-Van Disc Brake Pad Spreader, No. 702, Section 63, p. 761.
California Tool Co. catalog, Rimac, Disc Brake Pad Spreader, No. 0096, Section 63, p. 761.
A & E Tools, products brochure, Part No. 145, "Ford Dual Piston Caliper Retractor," p. 4, (Date Unknown, but prior to the present application).
A & E Tools, Part No. 135, "GM W-Car Front Piston Retractor," p. 24, (Date Unknown, but prior to the present application).
Cal-Van Tools, Specialty Tool Part No. 700, "Universal Disc Brake Pad Spreader," (Jun. 2000).
Blue-Point , Model BT350, "Dual Piston Brake Press Instructions," (May 2002).
Invention Disclosure Agreement by Akira lijima, "Brake Caliper Piston Spreader" dated Apr. 30, 1996.
Invention Disclosure Agreement by Louis J. Garcia, "Dual Piston Brake Caliper Compressor" dated May 9, 2000.
Invention Disclosure Agreement by Jeff Wedekind et al., "Disc Brake Spreader" dated Feb. 8, 2001.
Invention Disclosure Agreement by Hashmat Rahimi, "Dual Piston Brake Pad Spreader" dated Feb. 12, 2001.
Invention Disclosure Agreement by Robert Dunum, "Brake Single or Dual Piston Pushing Tool" dated Apr. 17, 2001.
Invention Disclosure Agreement by George P. Juliano, "Brake Piston Compressor Kit" dated Mar. 26, 1989.
Invention Disclosure Agreement by Marshall A. Green, "Disc Brake Pad Spreader" dated Jun. 29, 1995.
Invention Disclosure Agreement by Bernard H. Miller, "Disc Brake Pad Spreader" dated Mar. 18, 1996.
Invention Disclosure Agreement by Juan Lopez, "Disc Brake Pad Spreader" dated Jun. 18, 1997.
Invention Disclosure Agreement by Joe Barallon, "Tool for Seating Piston on Disc Brake Caliper" dated Jul. 9, 2000.
Invention Disclosure Agreement by Dal Sirany, "Brake Caliper Piston Retraction Tool" dated Dec. 5, 2000.
Invention Disclosure Agreement by George Gonzalez, "Disc Brake Pad Spreader" dated Aug. 16, 2001.
Invention Disclosure Agreement by Marlon Sampang, "Brake Caliper tool for Trucks" dated May 19, 1997.
Invention Disclosure Agreement by James Ratchovsky, "Hydraulic Disc Brake Caliper Piston Retractor Tool" dated Feb. 11, 2002.
Idea Disclosure Agreement by Timothy Patrick Hough, "Automotive Brake Caliper Spreader for Use With 1-6 Pistons" dated Feb. 13, 2006.
Idea Disclosure Agreement by Thomas Kobel, "Brake Caliper Piston Compressor" dated Jul. 14, 2008.
Idea Disclosure Agreement by Aaron Leftnick, "Dual and Quadruple Brake Caliper Piston Depressor" dated Mar. 24, 2009.
Idea Disclosure Agreement by Oscar L. Jimover, "Brake Caliper 406 Calliper Pistons" dated May 4, 2009.
Idea Disclosure Agreement by Benjamin J. Whisler, "Brake Caliper Piston Compression Tool" dated Jul. 13, 2009.
Idea Disclosure Agreement by Lance Lotspeich, "Brake Caliper Spreading for Opposed Piston Calipers" dated Sep. 11, 2009.
Idea Disclosure Agreement by Matt Hodges, "Brake Tool for Four Piston Disc Brakes" dated Feb. 9, 2010.
Snap-On, Press, Brake Caliper, Stock # BTCP1, http://buy1.snapon.com/catalog/item.asp?store=snapon-store&item_ID=88695&group_ID . . . dated Jan. 22, 2011.
BK Rider Brake Pad Disc Spreader (3808-0007); http://www.amazon.com/Rider-Brake-Disc-Spreader-3808-0007/dp/B008NYBKD6/ref=s . . . ; Nov. 14, 2012, 3 pages.
OTC Motorcycle Brake Caliper Spreader—OTC4743; http://www.amazon.com/OTC-Motorcycle-Brake-Caliper-Spreaader/dp/B0051XCOFY/ref . . . ; Nov. 14, 2012, 3 pages.
SPX/OTC, "Tools and Equipment for the Professional", May 1998, A-98 Catalog, Disc Brake Pad Spreader, No. 7034, p. 70.

* cited by examiner

BRAKE PAD SPREADER TOOL FOR DISC BRAKE ASSEMBLIES

BACKGROUND OF THE INVENTION

In a principal aspect the present invention relates to an automotive repair tool, and more particularly, a tool for compressing the caliper pistons of a vehicle disc brake assembly so that the disc pads may be removed and replaced. The invention thus comprises a manually actuated disc pad spreading tool which may be utilized for disc brake assemblies having one or multiple pistons associated with the disc brake caliper assembly.

Disc brakes typically include a caliper housing which is mounted adjacent a wheel. The housing includes opposed disc pads which are piston driven toward one another for clamping a rotating disc associated with a rotating wheel of the vehicle to brake or stop the vehicle. From time to time it is necessary to replace the pads due to the fact that they wear as a result of frictional contact with the rotating disc. In such circumstances, the caliper housing is typically removed from the wheel assembly of the vehicle. The outboard pad may then be removed and the inboard disc pad mounted in the housing may be caused to be spread apart by retracting the pad driving piston or pistons into the caliper housing. Alternatively, both pads may be engaged by a spreading tool to effect separation of the worn pads. The pistons which have been pushed back allow adequate room for installation of new pads. The caliper housing may then be replaced in the wheel assembly and positioned for engagement with the brake disc.

Heretofore, applicant's assignee has secured patent coverage with respect to automotive or vehicle repair tools useful with respect to the replacement of disc pads in a disc brake assembly. In particular, U.S. Pat. No. 6,874,217 issued Apr. 5, 2005 entitled "Disc Brake Pad Spreading Tool" describes one such tool. The aforesaid patent is incorporated herewith by reference in its entirety. Further, U.S. Pat. No. 7,076,850 issued Jul. 18, 2006 entitled "Dual Piston Disc Brake Caliper Compressor" discloses another tool having a similar function. The aforesaid patent is also incorporated herewith by reference. While such tools are deemed useful, the continued development and improvement of disc brake assemblies has resulted in the design of disc brake calipers having multiple pistons. For example, U.S. Pat. No. 7,076,850 referenced herein was especially designed for use with a dual piston disc brake assembly. Recently, however, automotive and vehicle manufacturers have increased the number of pistons associated with a caliper for a disc brake. For example, four pistons, and in some instances six pistons, have been incorporated in new designs.

Thus, there has developed a need for an improved disc brake spreading tool which can separate worn disc pads and retract multiple pistons simultaneously.

SUMMARY OF THE INVENTION

Briefly, the present invention is a disc brake pad spreading tool designed for separating disc pads by retraction of one or more pistons associated with a disc brake caliper. The tool is designed to provide an improved mechanical advantage with respect to prior known tools and to enable the simultaneous retraction of multiple pistons mounted in a disc brake caliper assembly. The tool includes a frame with a manually actuated drive or push rod advancement mechanism. The drive rod is moveable longitudinally through a backing plate mounted on the front side of the frame and includes a forward end attached to a pusher plate which is generally parallel to and moveable back and forth with respect to the backing plate in response to driving force generated through the push rod. The push rod may thus be actuated by a manual handle and drive assembly to spread the plates.

The opposite or back end of the push rod extends rearwardly from the frame and is connected to a separate arm assembly that extends over or around the frame through the backing plate and connects to the pusher plate. The arm assembly thus comprises a slide bar. The slide bar is connected to the back end of the push rod and extends through the backing plate into engagement with the pusher plate. The pusher plate and backing plate extend generally radially from the drive rod and are keyed to the drive rod and/or the slide bar. The slide bar and the push rod are consequently designed to move back and forth in unison in response to operation of the manual drive handle. Forward motion is effected by manual manipulation of the manual drive handle to impart incremental forward movement of the drive rod and pusher plate thereby separating the pusher plate from the backing plate. A release mechanism is provided to enable the drive mechanism to disengage and thereby enable reverse movement of the drive rod and pusher plate relative to the backing plate.

Because the backing plate and pusher plate extend radially outward from the drive rod and slide bar combination, they are cantilevered with respect thereto. The design provides for enhanced force for effecting separation of the pusher plate from the backing plate when the plates are positioned between disc pads and one or more caliper pistons to thereby retract the caliper pistons.

Thus, it is an object of the invention to provide a disc brake pad and piston compressing tool which provides for improved mechanical advantage, ease of use and the capability to be utilized to repair multiple piston disc brake caliper assemblies.

It is a further object of the invention to provide a disc brake pad retracting tool having a simplified construction which is economical, rugged and may easily be positioned for repair of a disc brake assembly.

Yet another object of the invention is to provide a disc brake pad spreading tool which is operable manually in a manner similar to known prior art tools, yet which provides improved mechanical advantage and operates in a manner which does not require significant training in the manner of its use relative to various prior art tools.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF AN EMBODIMENT OF THE INVENTION

Figure 1:
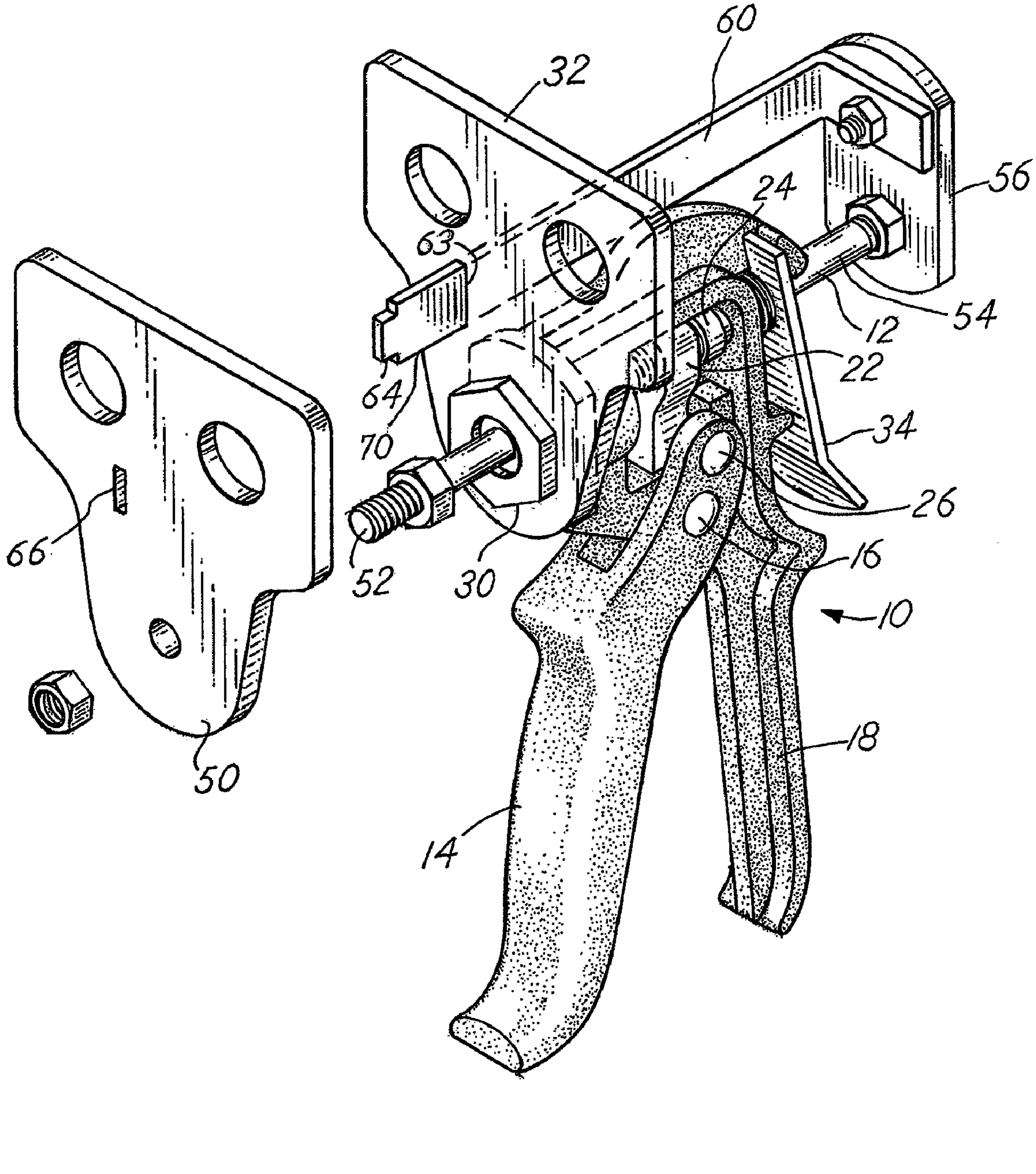
FIG. 1 is a partially exploded isometric view of the tool of the invention.
Figure 3:
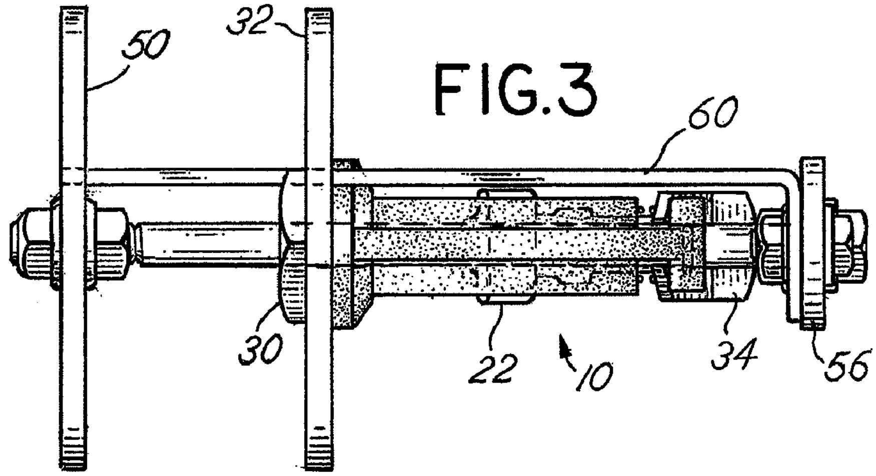
FIG. 3 is a top view of FIG. 2.
Figure 2:
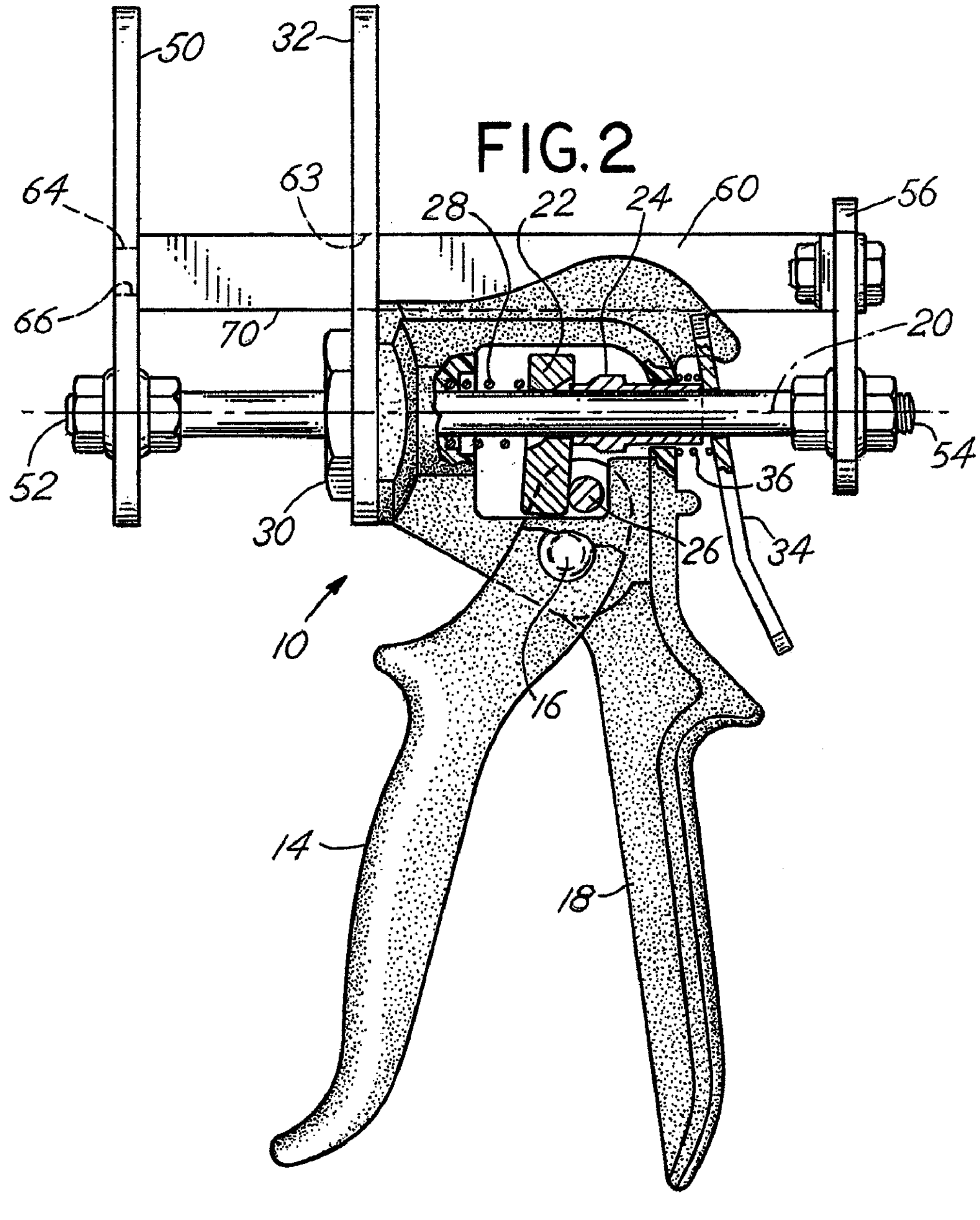
FIG. 2 is a side elevation of the tool of the invention.

Referring to the figures, the tool is comprised of a frame, such as a cast or machined metal frame 10. The style and type of frame 10 is not a limitation of the invention. The frame 10 is designed to support a longitudinal drive or push rod 12 by means of a handle 14 which is pivotally mounted to the frame 10 on a pin 16. Thus, the handle 14 is pivotal with respect to fixed handle member 18 which is formed integrally with the frame 10. The push rod 12 slidably extends through openings in the frame 10 for movement axially with respect to a longitudinal push rod axis 20 in response to actuation of a driving dog 22 which is positioned to engage or reciprocate on a bushing 24 fixed to the drive rod 12. The driving dog 22 moves or is responsive to actuation of the handle 14 due to engagement of a driving pin 26 that impinges upon the driving dog 22 compressing a spring 28 and simultaneously engaging the bushing 24 to drive the drive rod 12 in a forward direction along the axis 20 through a flanged nut 30. The flanged nut 30 retains the spring 28 in position, but also serves to hold a backing plate 32 fixed in position on the frame 10.

A biased drive rod release lever 34 is pivotally mounted on the frame 10. The release lever 34 holds the drive rod 12 in a fixed position as it is incrementally driven each step forward by actuation of the handle 14. Release lever spring 36 maintains the lever 34 in the locking position until the lever 34 is pivoted manually toward the stop 38 integrally incorporated in and projecting from the frame 10.

The overall operation of the manual drive mechanism for effecting movement in the forward axial direction as well as release for reverse movement in the rearward axial direction of the drive rod 12 is substantially functionally the same as set forth in the previously identified U.S. Pat. Nos. 6,874,217 and 7,076,850. Consequently, the mechanism for advancing the drive rod and retraction of the drive rod 12, though substantially similar to the prior art drive rod mechanisms, is not a limiting feature of the invention. That is, the construction of the frame 10, the construction of the driving dog 22, bushing 24 and other elements of the assembly may be varied, replaced, changed or revised to achieve the same functionality or similar functionality without departing from the spirit and scope of the invention.

Additional features of the present invention comprise the configuration of the backing plate 32 as well as a companion plate; namely, a pusher plate 50 mounted on the forward end 52 of the drive rod 12 or push rod 12. In addition, the push rod 12 includes a rear end or back end 54 to which a connecting element or plate 56 is attached and projects radially therefrom where it comprises a portion of an arm assembly 58. The arm assembly 58 includes a slide bar 60 which is affixed at its rear end or back end 62 to the connecting bar or bracket 56. Slide bar 60 is generally parallel to axis 20 and drive rod 12.

The arm assembly 58 further includes the slide bar 60 having a substantially uniform, non-circular, geometric cross section configuration. In the disclosed embodiment, the configuration is a rectangular cross sectional configuration, though that is not a limiting feature of the invention. The slide bar 60 passes through a congruent opening 63 in the backing plate 32 and is slidable therethrough. The slide bar 60 extends forwardly to engage the pusher plate 50 and is keyed to that plate 50 by a projection 64 which extends through a compatible sized, congruent opening 66 in the pusher plate 50. Projection 64 is configured to insure that slide bar 60 will engage and drive pusher plate 50 in the axial forward direction simultaneously with movement of drive rod 12, but does not, in the embodiment depicted, drive the pusher plate 50 in the reverse axial direction. Projection 64 thus is of lesser size and cross section than slide bar 60 cross section and size.

Slide bar 60 is generally parallel to and moves in the same axial direction as the drive rod 12 inasmuch as the drive rod 12 is connected or essentially fixed at opposite ends to the pusher plate 50. Thus, as the drive rod 12 moves either in the forward or the rearward direction within the frame 10, the slide bar 60 will simultaneously follow that movement. Further, because the slide bar 60 is keyed both to the backing plate 32 as well as the pusher plate 50, the plates 32 and 50 remain aligned with respect to one another and will not rotate relative to one another. Thus, they move in unison, generally in parallel, in response to actuated movement or release of the drive rod 12.

In the embodiment disclosed, the drive rod 12 is a cylindrical rod or bar. It is slidably mounted in cylindrical passages in the frame 10. Thus, it is not keyed to the frame. On the other hand, the slide bar 60 is keyed to the plates 32 and 50. The lower edge 70 of the slide bar 60 may also fit against a flat edge (not shown) of the flanged nut assembly in the embodiment disclosed to preclude rotation of the plates 32 and 50 about the axis 20. Alternatively, the edge 70 may slidably engage or be positioned on or against the frame to inhibit rotation of plates 50, 32.

The plates 32 and 50 not only remain in a perpendicular or normal orientation relative to the axis 20, but they extend radially outwardly from the axis 20 along a radial center line 76 which is generally aligned with the handles 14 and 18. This facilitates maintenance of balance in the operation of the tool. Note, however, that the tool may be adjusted so that the edge 70 of slide bar 60 is engaged with other flat surfaces associated with the frame 10 to maintain an orientation other than one of alignment with the handles 14 and 18.

Figure 4:
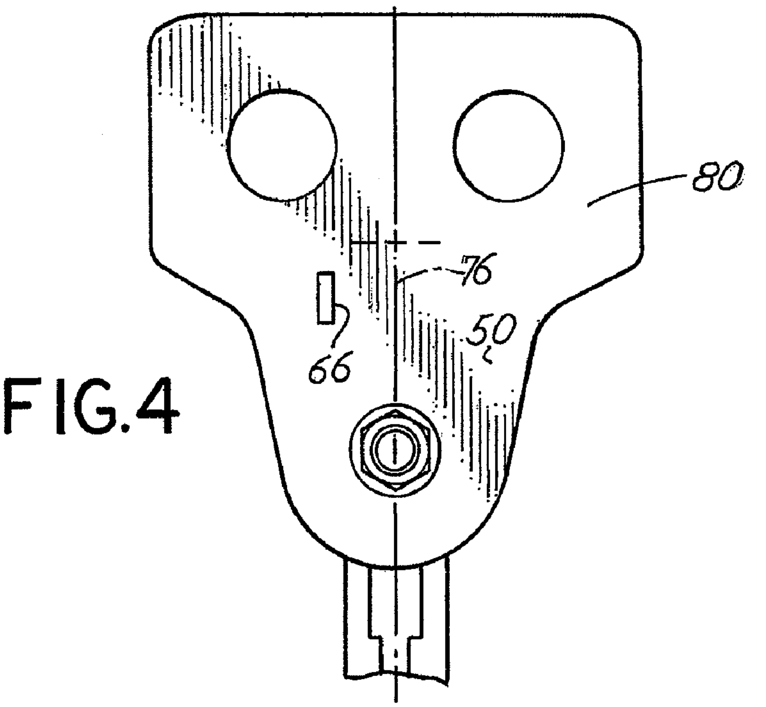
FIG. 4 is a forward end elevation of FIG. 2.
Figure 5:
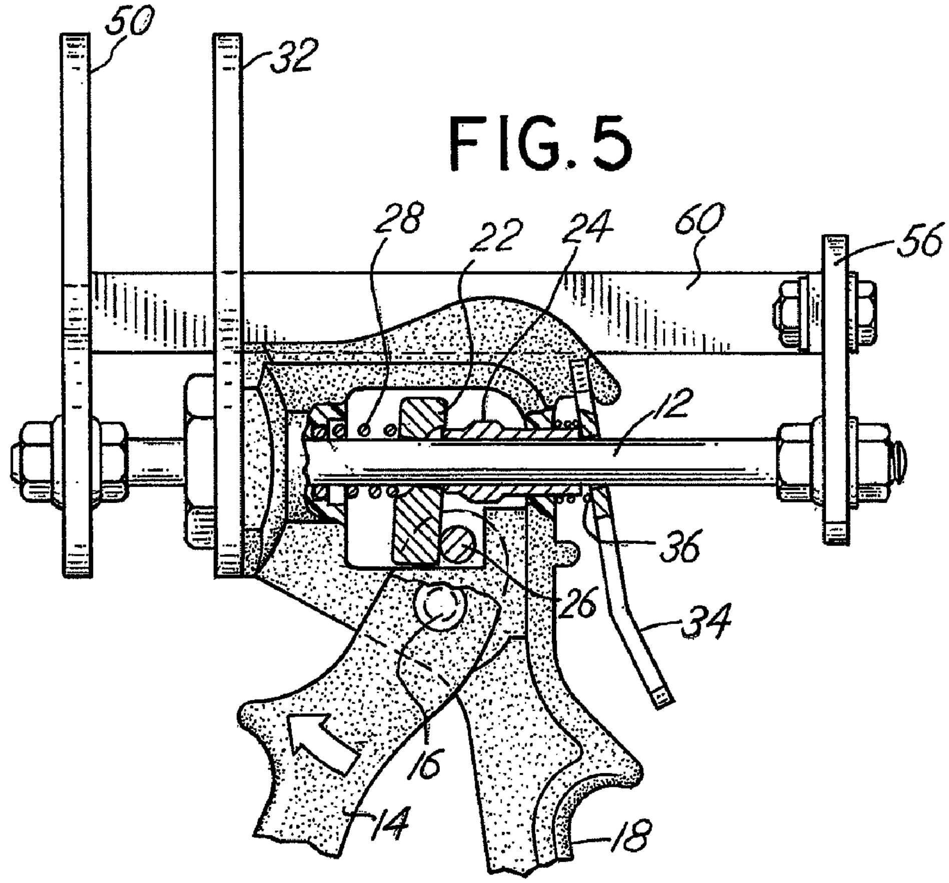
FIG. 5 is a partial side elevation of the tool prior to actuation of the manual handle to effect movement of the pusher plate.

The slide bar 60 is radially spaced from the axis 20. A major portion of the plates 32 and 50 is spaced or positioned even further radially from the axis 20. In other words, the active area or region of the plates, such as the region 80 in FIG. 4, is located outwardly and generally radially from the axis 20. The plates 32 and 50 are thus mounted in cantilever array on the drive rod 12 with the active area or region 80 designed to engage caliper pistons of a caliper disc brake assembly. Thus, the main portion of the tool including the handle and body assembly do not interfere with the operation of the plates 32 and 50 when engaging disc brake caliper pistons and disc pads thereby lending greater flexibility to the use and utility of the tool.

The plates 32 and 50 have a substantially identical shape or configuration, though this is not a limiting feature of the invention. Further, the region, such as the region 80 in FIG. 4 of the plate 50, may be configured in a manner that enables engagement thereof with multiple pistons and various configurations of the arrangement of pistons associated with a disc brake caliper assembly. Likewise, the backing plate 32 may be custom configured. Further, the plates 32 and 50 need not have the same or identical configuration or profiles.

Figure 7:
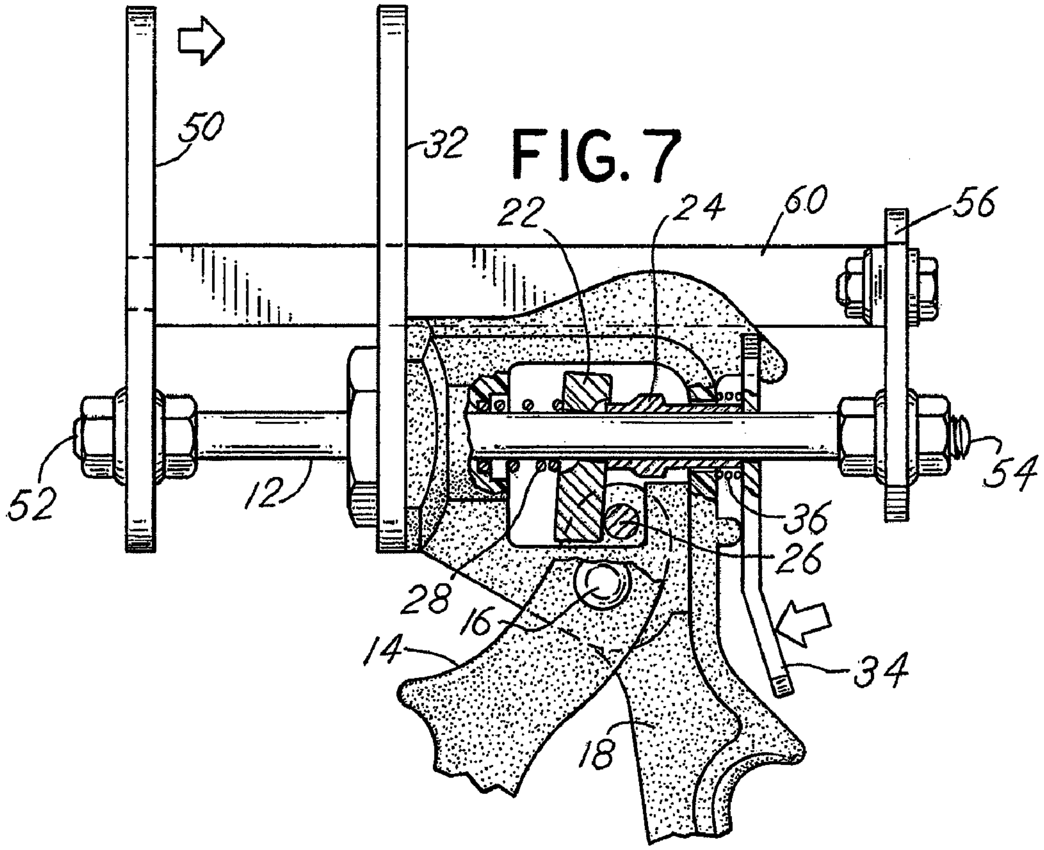
FIG. 7 is a partial side elevation of the tool with the drive rod release lever positioned to enable rearward movement of the drive rod and slide bar.
Figure 6:
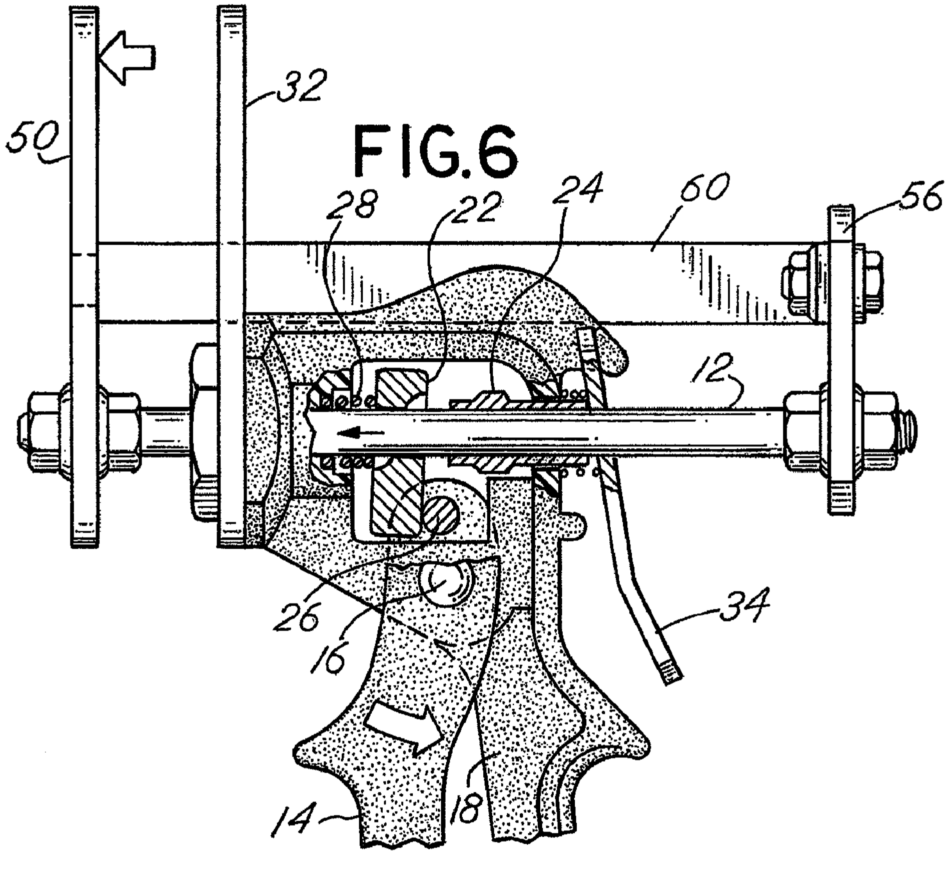
FIG. 6 is a partial side elevation of the tool subsequent to actuation of the manual handle to effect movement of the pusher plate.
Figure 8:
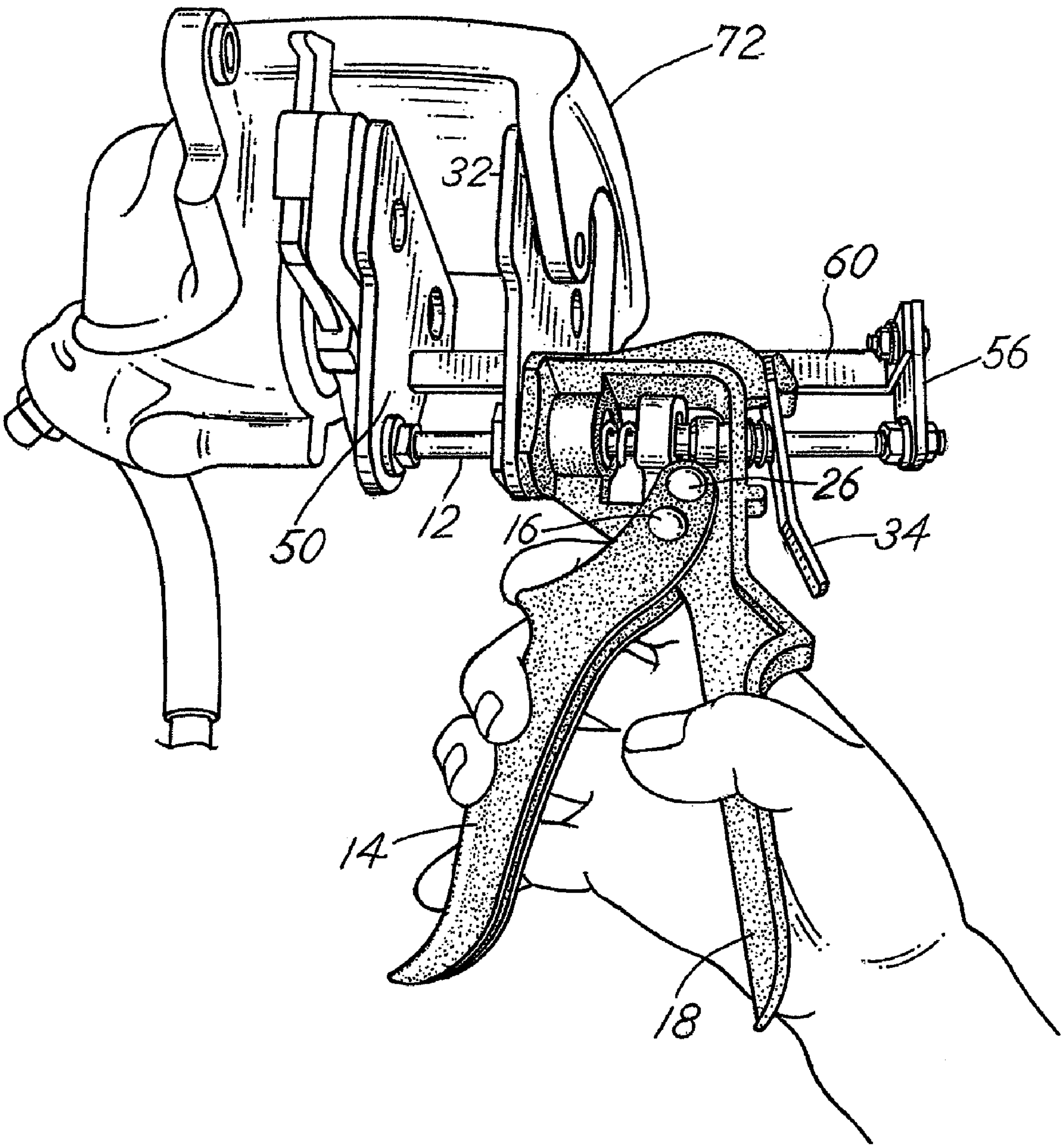
FIG. 8 is an isometric view illustrating the manner of use of the tool of the invention.
Figure 1:
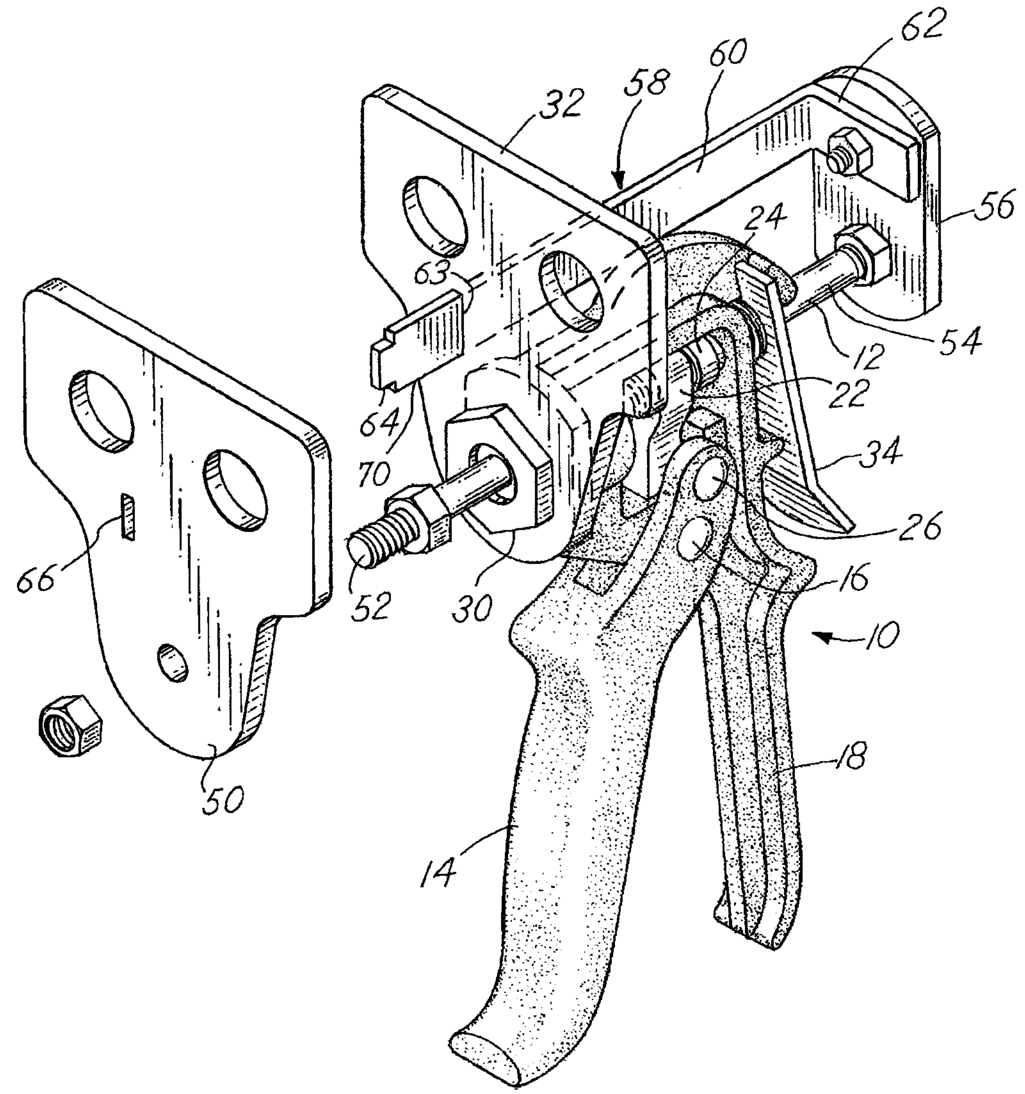
Figure 3:
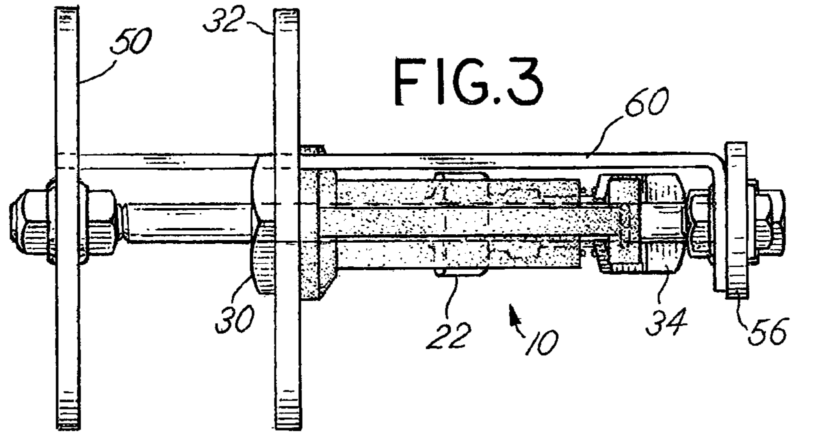
Figure 2:
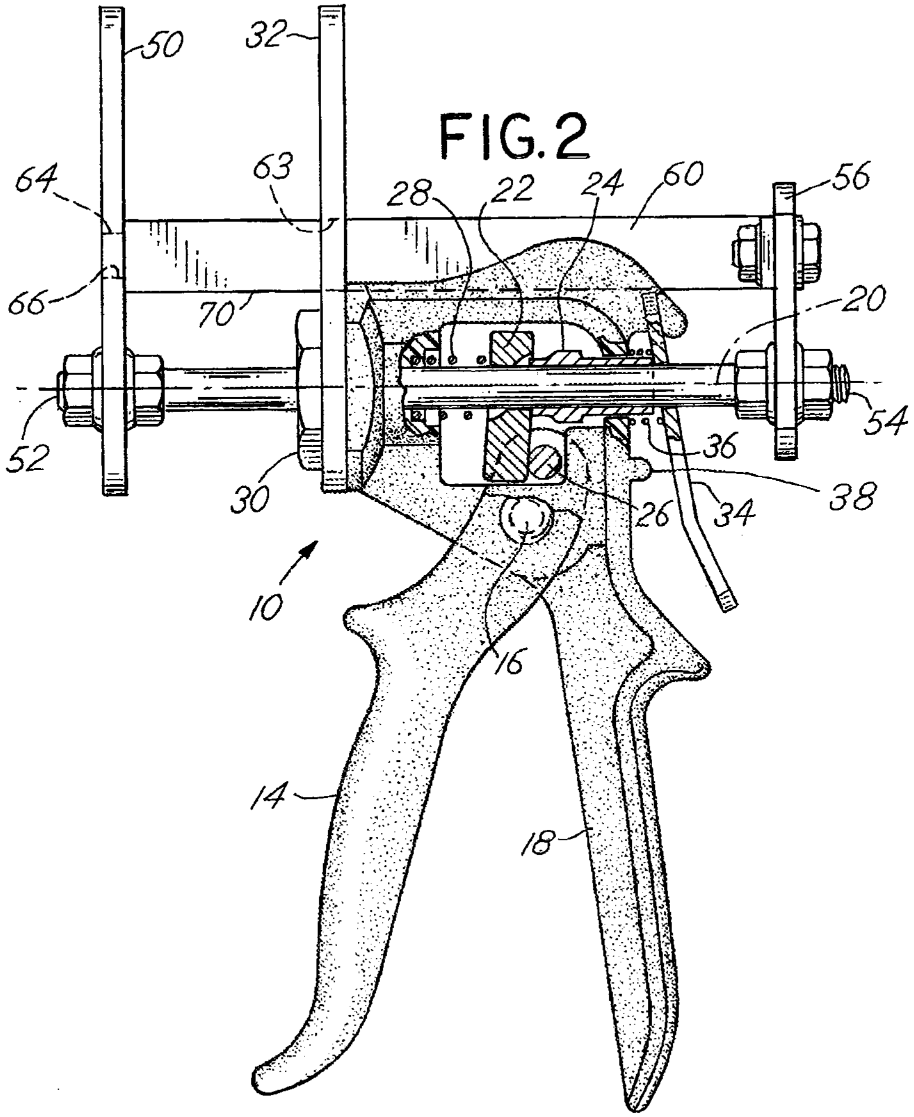
Figure 4:
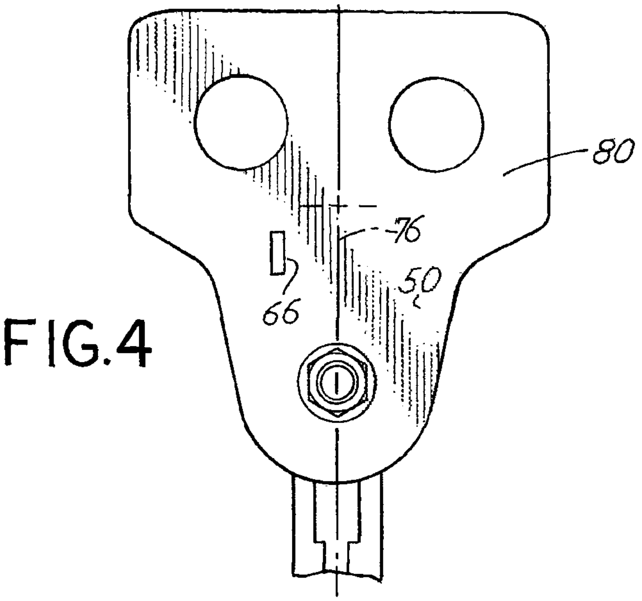
Figure 5:
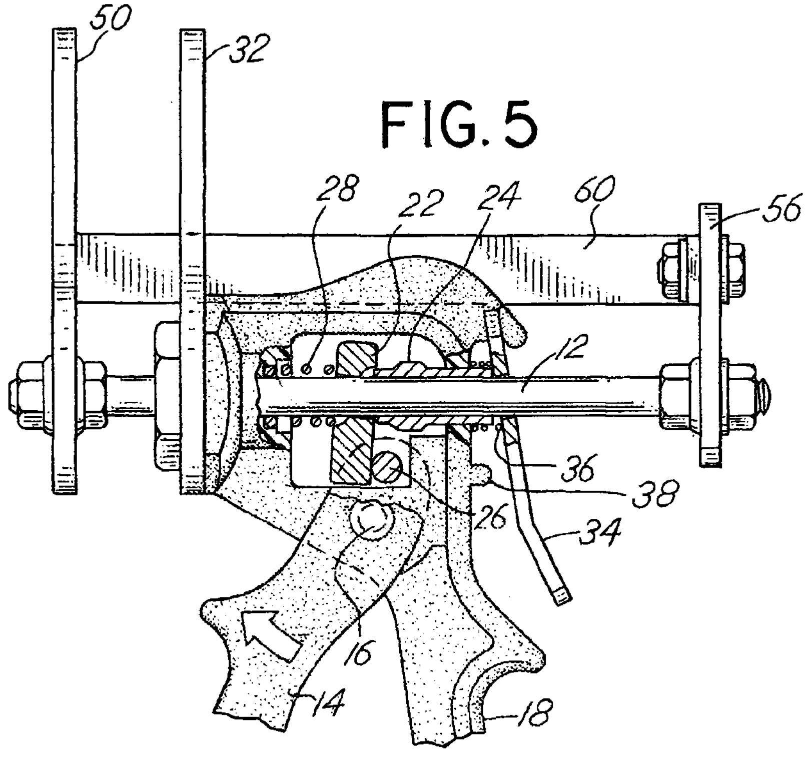
Figure 7:
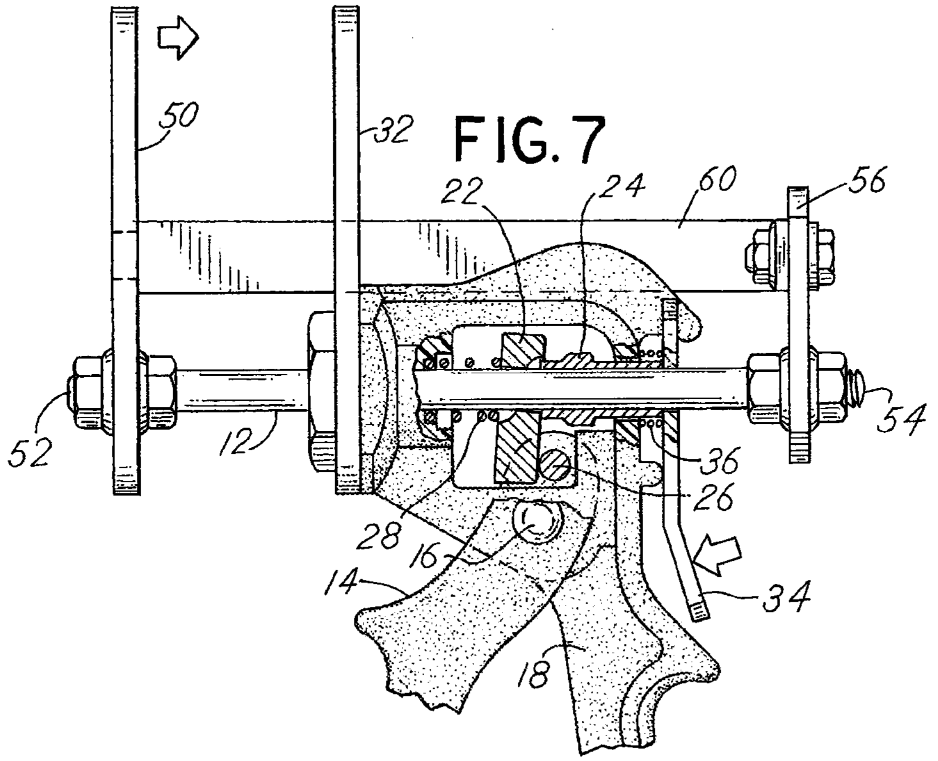
Figure 6:
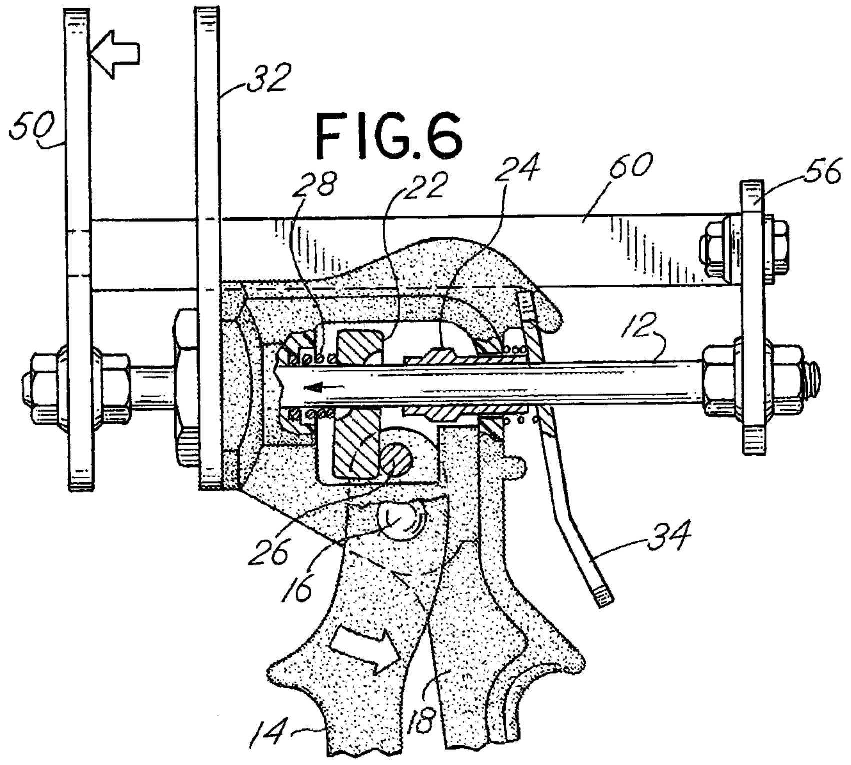
Figure 8:
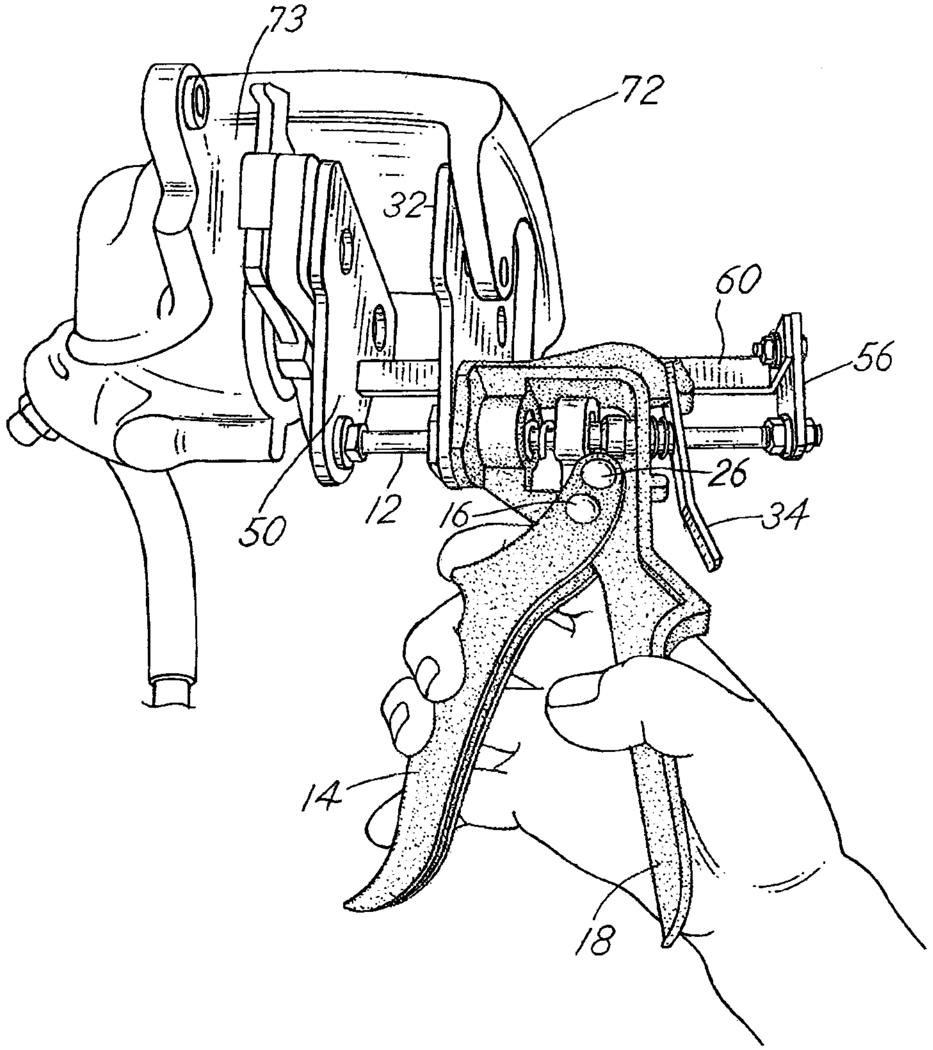

In use the plates 32, 50 are positioned in a disc brake caliper 72 intermediate a piston housing 73 and the opposite side of the caliper 72 as shown in FIG. 8. The plate 50 is retracted prior to such positioning such as depicted in FIG. 6 and the moveable handle 14 is pivoted and reciprocated manually to effect movement of drive rod 12 and separation of plate 50 to compress pistons in housing 73. The tool may then be removed following retraction of plate 50 due to clockwise movement of lever 34 as shown in FIG. 7 and release of drive rod 12. The disc pads may then be replaced.

Various tests using the design depicted indicates that the cantilever design that is reinforced by the use of the slide bar 60, and may effectively generate more force as contrasted to prior art designs. Thus, in addition to the flexibility that is achieved by virtue of the design, the amount of force that can be effectively imported to simultaneously engage and compress multiple pistons in a disc brake assembly is significantly enhanced with the design set forth. Various alternative constructions are disclosed or suggested, but these are not to be considered a limitation of the invention. For example, the slide bar is keyed to the backing plate 32 and pusher plate 50 as described. However, it may be appropriate in certain circumstances to employ a rod 12 that is non-circular in order to provide a keying feature to maintain alignment of various parts. Further, various other drive mechanisms may be used to move the drive rod 12 and pusher plate 60, or an equivalent thereof. While there has been set forth an embodiment of the invention, it is to be understood that the invention is to be limited only by the following claims and equivalents thereof.

What is claimed is:

1. A tool for spreading brake pads by compressing one or more pistons of a disc brake assembly, said brake assembly including a disc brake caliper housing, said one or more pistons mounted in generally parallel array in the caliper housing, said pads mounted on generally opposed pad mounts attached to said pistons or to the housing for engagement with a brake disc member therebetween, said tool comprising, in combination:

a manual drive mechanism mounted in a frame and including an axially extending drive rod having a longitudinal axis, an outer end extending forwardly from the frame, an inner end extending rearwardly from the frame, said drive mechanism further including a manually actuable handle attached to the frame for incrementally advancing the rod in a first axial direction forwardly from the frame, and a latch mechanism for retaining the rod in an advanced position in the frame, said latch mechanism being releasable to enable rearward axial movement of the rod in a direction opposite forwardly advancement thereof;

a backing plate affixed to the frame, said backing plate extending generally perpendicular to the axially extending rod; said rod slibably extending through said backing plate;

a pusher plate mounted on the outer end of the drive rod, said pusher plate generally parallel to said backing plate and generally extending in a direction aligned with the direction of the backing plate; and an arm assembly connecting the inner end of the drive rod and the pusher plate, said arm assembly including an elongate slide bar generally parallel to the drive rod and extending through a passage in the backing plate whereby upon axial direction movement of the drive rod to adjust spacing between the backing plate and the pusher plate said slide bar simultaneously moves therewith, said plates keyed by at least one of said drive rod and said slide bar to maintain their orientation with respect to each other about the longitudinal axis of the drive rod.

2. The tool of claim 1 wherein the backing plate and pusher plate have substantially the same profile.

3. The tool of claim 1 wherein the slide bar has a non-circular cross section and is keyed to the plates.

4. The tool of claim 1 wherein the arm assembly includes a connecting plate attached to the rear end of the drive rod and further including an attachment of the connecting plate to the slide bar.

5. The tool of claim 1 wherein the backing plate and pusher plate extend generally radially from the longitudinal axis of the drive rod.

6. The tool of claim 5 wherein the slide bar engages the pusher plate at a radial distance from the drive rod.

7. The tool of claim 6 wherein the plates extend radially outwardly from the connection of the slide bar to the pusher plate.

8. The tool of claim 1 wherein the slide bar includes a flat side slidably engageable with the frame to thereby generally prevent rotation of the slide bar about the drive rod axis.

9. A tool for spreading brake pads by compressing one or more pistons of a disc brake assembly, said brake assembly including a disc brake caliper housing, said one or more pistons mounted in generally parallel array in the caliper housing, said pads mounted on generally opposed pad mounts attached to said pistons or to the housing for engagement with a brake disc member therebetween, said tool comprising, in combination:

a manual drive mechanism mounted in a frame and including an axially extending drive rod having a longitudinal axis, an outer end extending forwardly from the frame, an inner end extending rearwardly from the frame, said drive mechanism further including a manually actuable handle attached to the frame for incrementally advancing the rod in a first axial direction forwardly from the frame, and a latch mechanism for retaining the rod in an advanced position in the frame, said latch mechanism being releasable to enable rearward axial movement of the rod in a direction opposite forwardly advancement thereof;

a backing plate affixed to the frame, said backing plate extending generally perpendicular to the axially extending rod; said rod slibably extending through said backing plate;

a pusher plate mounted on the outer end of the drive rod, said pusher plate generally parallel to said backing plate and generally extending in a direction aligned with the direction of the backing plate; and an arm assembly connecting the inner end of the drive rod and the pusher plate, said arm assembly including an elongate slide bar generally parallel to the drive rod and extending through a passage in the backing plate whereby upon axial direction movement of the drive rod to adjust spacing between the backing plate and the pusher plate said slide bar simultaneously moves therewith.

10. The tool of claim 9 wherein the backing plate and pusher plate have substantially the same profile.

11. The tool of claim 9 wherein the slide bar has a non-circular cross section and is keyed to the plates.

12. The tool of claim 9 wherein the arm assembly includes a connecting plate attached to the rear end of the drive rod and further including an attachment of the connecting plate to the slide bar.

13. The tool of claim 9 wherein the backing plate and pusher plate extend generally radially from the longitudinal axis of the drive rod.

14. The tool of claim 9 wherein the slide bar engages the pusher plate at a radial distance from the drive rod.

15. The tool of claim 9 wherein the plates extend radially outwardly from the connection of the slide bar to the pusher plate.

16. The tool of claim 9 wherein the slide bar includes a flat side slidably engageable with the frame to thereby generally prevent rotation of the slide bar about the drive rod axis.

* * * * *

UNITED STATES PATENT AND TRADEMARK OFFICE
CERTIFICATE OF CORRECTION

PATENT NO. : 8,393,063 B2
APPLICATION NO. : 13/091861
DATED : March 12, 2013
INVENTOR(S) : Hodges et al.

It is certified that error appears in the above-identified patent and that said Letters Patent is hereby corrected as shown below:

The Title page, showing the illustrative figure, should be deleted and substitute therefor the attached Title page.

In the Drawings:

Delete figs. 1-8 and substitute therefor the drawing sheets, consisting of figs. 1-8 as shown on the attached pages.

In the Specification:

Column 3, line 17:
Delete “on” and insert --in--.

Column 3, line 18:
Delete “fixed to” and insert --on--.

Column 3, line 22:
Delete “bushing 24” and insert --dog 22--.

In the Claims:

Column 5, Claim 1, line 42:
Delete “slibably” and insert --slidably--.

Signed and Sealed this
Twenty-third Day of July, 2013

Teresa Stanek Rea
*Acting Director of the United States Patent and Trademark Office*

(12) United States Patent
Hodges et al.

(10) Patent No.: US 8,393,063 B2
(45) Date of Patent: Mar. 12, 2013

(54) BRAKE PAD SPREADER TOOL FOR DISC BRAKE ASSEMBLIES

(75) Inventors: Matthew M. Hodges, Lincoln, NE (US); Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 188 days.

(21) Appl. No.: 13/091,861

(22) Filed: Apr. 21, 2011

(65) Prior Publication Data

US 2012/0266428 A1 Oct. 25, 2012

(51) Int. Cl.
*B23P 19/04* (2006.01)
*B25B 27/00* (2006.01)

(52) U.S. Cl. .................. 29/239; 81/487; 269/6; 269/96; 269/128; 29/268

(58) Field of Classification Search .................. 269/128, 269/160, 203, 205, 216, 254 CS, 3, 6, 96; 29/239, 244, 267, 268; 81/485, 487; *B25B 27/16*
See application file for complete search history.

(56) References Cited

U.S. PATENT DOCUMENTS

| | | | | | |
|---|---|---|---|---|---|
| 1,339,448 | A | * | 5/1920 | Forsman et al. | 269/3 |
| 2,160,652 | A | | 5/1939 | Feigh | |
| 2,249,651 | A | * | 7/1941 | Gilbert | 24/527 |
| 3,427,016 | A | * | 2/1969 | Harris | 269/214 |
| 3,492,854 | A | * | 2/1970 | Eppler | 72/412 |
| 3,705,581 | A | * | 12/1972 | Drake | 606/53 |
| 3,835,522 | A | * | 9/1974 | Ward | 29/239 |
| 4,220,322 | A | * | 9/1980 | Hobday | 269/6 |
| 4,253,648 | A | * | 3/1981 | Meeks | 269/4 |
| 4,893,801 | A | * | 1/1990 | Flinn | 269/6 |
| 4,926,722 | A | * | 5/1990 | Sorensen et al. | 81/487 |
| 5,170,682 | A | * | 12/1992 | Sorensen et al. | 81/487 |
| 5,709,372 | A | * | 1/1998 | Lii | 269/6 |
| 5,732,936 | A | | 3/1998 | Lii | |
| 6,523,238 | B1 | * | 2/2003 | Priddy | 29/239 |
| 6,574,846 | B1 | * | 6/2003 | Kang | 29/239 |
| 6,585,243 | B1 | | 7/2003 | Li | |
| 6,678,931 | B1 | * | 1/2004 | Tatasciore | 29/239 |
| 6,874,217 | B2 | * | 4/2005 | Ploeger et al. | 29/239 |
| 7,076,850 | B2 | * | 7/2006 | Ploeger et al. | 29/239 |
| 7,155,792 | B1 | | 1/2007 | Miller, Jr. | |
| 8,276,251 | B2 | | 10/2012 | Mitchell | |
| 2002/0070490 | A1 | * | 6/2002 | Klimach et al. | 269/6 |
| 2004/0123438 | A1 | * | 7/2004 | Kang | 29/239 |
| 2004/0255445 | A1 | | 12/2004 | Ploeger et al. | |
| 2005/0000073 | A1 | * | 1/2005 | Ploeger et al. | 29/239 |

(Continued)

FOREIGN PATENT DOCUMENTS

GB 2 194 989 A 3/2011

OTHER PUBLICATIONS

Lisle catalog, No. 24400 disc Brake Pad Spreader, p. 4.

(Continued)

*Primary Examiner* — Lee D Wilson
*Assistant Examiner* — Tyrone V Hall, Jr.
(74) *Attorney, Agent, or Firm* — Banner & Witcoff, Ltd

(57) ABSTRACT

A tool for spreading disc brake pads and compressing pistons of a disc brake caliper assembly includes a manually operated handle to drive a rod attached to a pusher plate. An arm assembly also connects the back end of the drive rod to the pusher plate. The plates thus extend in cantilever fashion from the drive rod and may be maintained in alignment by the arm assembly which also serves to reinforce the cantilever arrangement of the plates.

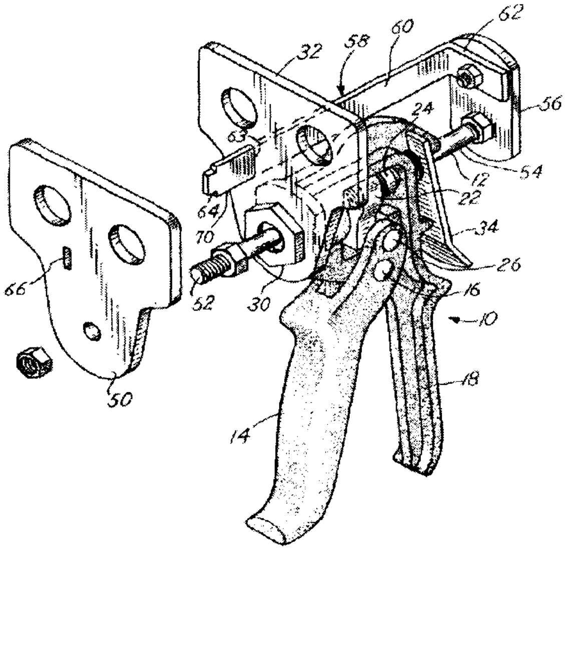

16 Claims, 5 Drawing Sheets